US008380858B2

(12) United States Patent
Froelich (10) Patent No.: US 8,380,858 B2
(45) Date of Patent: Feb. 19, 2013

(54) SYSTEM AND METHOD FOR TELECOMMUNICATION WITH A WEB-BASED NETWORK, SUCH AS A SOCIAL NETWORK

(75) Inventor: Raymond Froelich, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 965 days.

(21) Appl. No.: 12/406,050

(22) Filed: Mar. 17, 2009

(65) Prior Publication Data
US 2010/0238919 A1 Sep. 23, 2010

(51) Int. Cl.
G06F 13/00 (2006.01)
(52) U.S. Cl. .................... 709/228; 709/206; 709/219
(58) Field of Classification Search .............. 709/204, 709/206, 217, 219, 223, 224, 227, 228, 250
See application file for complete search history.

(56) References Cited

U.S. PATENT DOCUMENTS

| 2006/0256816 | A1 | 11/2006 | Yarlagadda et al. |
| 2007/0255807 | A1 | 11/2007 | Hayashi et al. |
| 2008/0134052 | A1 | 6/2008 | Davis et al. |
| 2008/0155080 | A1 | 6/2008 | Marlow et al. |
| 2008/0189399 | A1 | 8/2008 | Quoc et al. |
| 2008/0235242 | A1 | 9/2008 | Swanburg et al. |
| 2008/0243853 | A1 | 10/2008 | Reding et al. |
| 2010/0005059 | A1* | 1/2010 | Banerjee et al. ............. 707/3 |
| 2010/0036912 | A1* | 2/2010 | Rao ............................. 709/204 |
| 2010/0077045 | A1* | 3/2010 | Bercu et al. ................. 709/206 |
| 2011/0213800 | A1* | 9/2011 | Saros et al. .................. 707/769 |

FOREIGN PATENT DOCUMENTS

JP 2008259153 A 10/2008

OTHER PUBLICATIONS

"Answer calls on the move," Skype, http://www.skype.com/allfeatures/callforwarding/ [Last Accessed May 20, 2010], 2 pages.
"New software enables FREE International phone calls with any mobile phone through Skype," Aug. 3, 2005, http://gizmag.com/go/4361 [Last Accessed May 20, 2010], 1 page.
"Skype for the Nokia N800/N810," Skype, http://www.skype.com/download/skype/nokia/ [Last Accessed Sep. 11, 2008], 1 page.
"Voice—Save money and talk for hours!" http://messenger.yahoo.com/features/voice/ [Last Accessed May 20, 2010], 1 page.
"Your Personal online number," Skype, http://www.skype.com/allfeatures/onlinenumber/ [Last Accessed May 20, 2010], 3 pages.
Leyden, Joel, "Free Internet Mobile Phone Calls Offered by UbiFone MOVOIP," Jun. 28, 2008, Israel News Agency, 5 pages.
International Search Report and Written Opinion for PCT/US2010/027354, Filed Date: Mar. 15, 2010, Applicant T-Mobile USA, Inc., Mailing Date: Oct. 13, 2010, 10 pages.

* cited by examiner

Primary Examiner — Viet Vu
(74) Attorney, Agent, or Firm — Perkins Coie LLP (57) ABSTRACT

A system and method is described for establishing a communications session between a telecommunications device and one or more registered users on web-based networks, such as social networks. Further details and features are described herein.

29 Claims, 7 Drawing Sheets

FIG. 1A

| Web-based network (e.g., SN) | Identifier (e.g., MSISDN) | Registration information (e.g., username, password) | Buddies | Internal Number | Presence Information (e.g., online or offline) |
|---|---|---|---|---|---|
| SN1 (e.g., SKYPE) | ID1 | Username "A," Password "A" | screen_name1 | 123456 | ONLINE |
| SN1 (e.g., SKYPE) | ID1 | Username "A," Password "A" | screen_name2 | 789123KL | ONLINE |
| SN1 (e.g., SKYPE) | ID1 | Username "A," Password "A" | screen_name3 | L8T4AD8T | OFFLINE |
| SN2 (e.g., YAHOO) | ID1 | Username "B," Password "B" | screen_name4 | 45625786 | ONLINE |
| SN2 (e.g., YAHOO) | ID1 | Username "B," Password "B" | screen_name5 | 35879256 | OFFLINE |
| SN2 (e.g., YAHOO) | ID1 | Username "B," Password "B" | screen_name6 | 21484653 | OFFLINE |
| SN1 (e.g., SKYPE) | ID2 | Username "C," Password "C" | screen_name1 | 045892FG | ONLINE |
| SN1 (e.g., SKYPE) | ID2 | Username "C," Password "C" | screen_name2 | 256489LJN | ONLINE |
| SN1 (e.g., SKYPE) | ID2 | Username "C," Password "C" | screen_name7 | 357925KYR | OFFLINE |

SYSTEM AND METHOD FOR TELECOMMUNICATION WITH A WEB-BASED NETWORK, SUCH AS A SOCIAL NETWORK

BACKGROUND

Web-based social networks (SNs), such as FACEBOOK®, MYSPACE®, and SKYPE®, have become ubiquitous. Social networks typically provide a variety of ways for registered users to interact with one another, such as IM (Instant Messaging), voicemail, multimedia messaging (MMS), email, voice and/or video calling. Furthermore, it is common for social networks to offer a contact list (e.g., a "buddy" list or "friends" list) application which is a collection of screen names that represent registered users on a respective SN. The contact list typically indicates the real-time presence status of the registered users (i.e., on-line or off-line) on the respective social network and serves as a shortcut to initiate communication, such as voice or video calling with a desired contact on the contact list.

Social network users may access social networks via PCs, handheld computers, mobile phones or any web-based device (e.g., smartphone). Computer users who are registered with multiple social networks must log on to each of the respective social network websites in order to access their accounts and respective contact lists. Currently, users of devices other than computers, such as mobile phones, smartphones or similar wired or wireless telecommunications devices, may log on to each respective social network website much like a computer user, or may install a client-specific (i.e., social network specific) software application on the device that enables access to the social networking services. The software application allows the device user to, for example, quickly and sometimes seamlessly login to the user's social network account to view and/or access his/her contact list, communicate with a desired contact by way of, for example, voice calling, and to receive an indication of the real-time presence status of the registered contacts. For instance, if a mobile phone user wishes to initiate a voice communication with a contact identified in a "buddy list" associated with a social networking service, the mobile phone user must install the relevant application, run the application, select the relevant contact from the buddy list, and then initiate the voice communication.

The need exists for a system that eliminates these multiple steps and provides device users with the ability to initiate a variety of telecommunication services with one or more contacts without having to log on to a social networking service, install special applications enabling telecommunication services with the social networking service, select the contact(s) with whom to engage in a telecommunication session, etc. Overall, the examples herein of some prior or related systems and their associated limitations are intended to be illustrative and not exclusive. Other limitations of existing or prior systems will become apparent to those of skill in the art upon reading the following Detailed Description.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 202 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention incorporates many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overtly and specifically defined as such in this Detailed Description section.

System Description

Figure 1A:
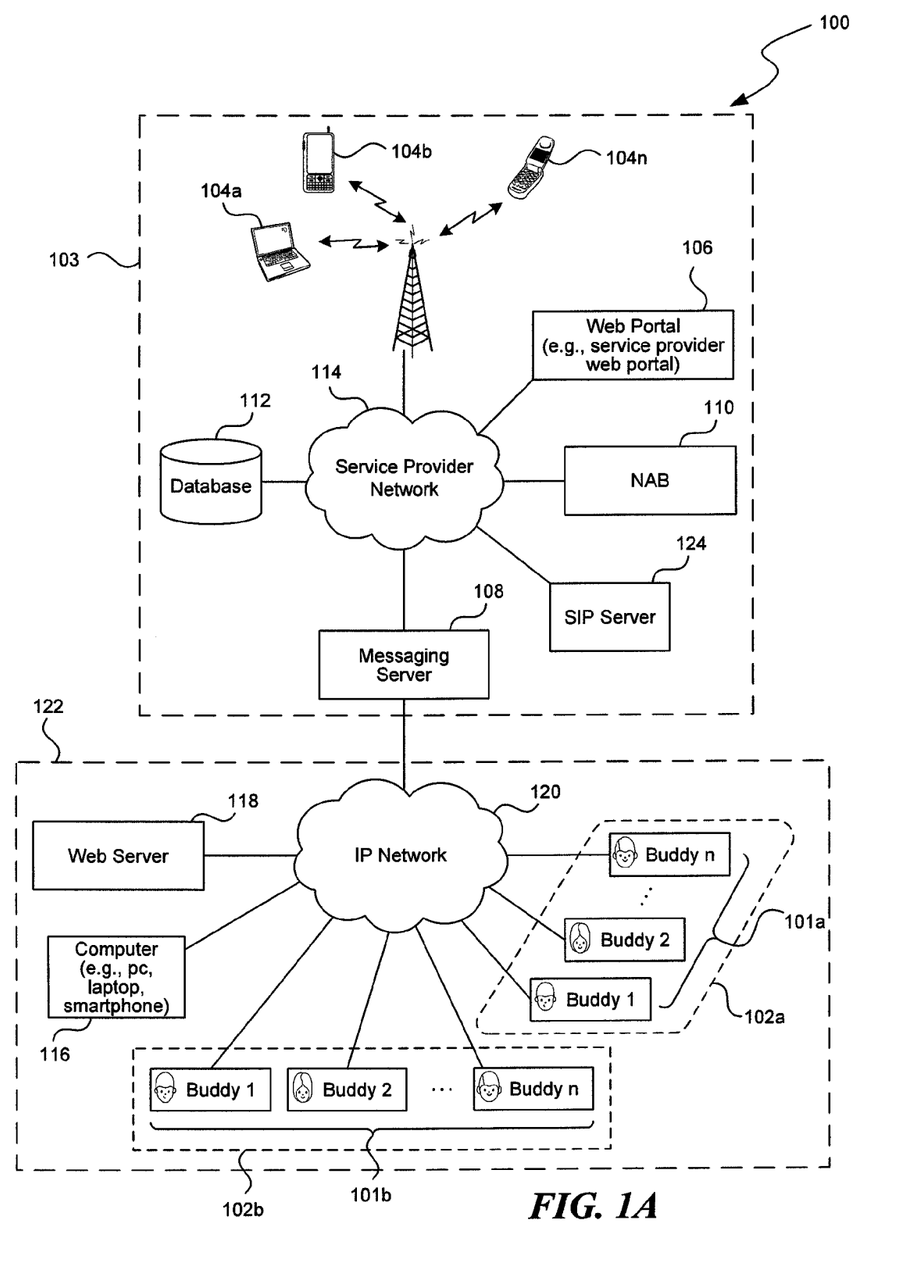
FIG. 1A is a system level illustration of a system configured to establish telecommunication with one or more web-based networks.

FIG. 1A and the following discussion provide a brief, general description of a suitable environment in which the invention can be implemented. Although not required, aspects of the invention are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices (including personal digital assistants (PDAs)), wearable computers, all manner of corded, landline, fixed line, cordless, cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor. Additionally, the term contacts and "buddies" will be used interchangeably herein and should not be construed as limiting the scope of the invention. In some embodiments an address book of a device (e.g., cellular phone, fixed or mobile device, such as a wired, wireless or cordless phone, Unlicensed Mobile Access or UMA enabled device, portable computer, handheld computer, smartphone, media player, and the like) may be analogous to a "buddy" or contact list.

While aspects of the invention, such as certain functions, are described as being performed exclusively or primarily on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 1A shows a schematic illustration of a system 100 used to establish telecommunication between one or more user devices 104a, 104b . . . 104n (collectively referred to as 104) and one or more web-based networks or network sites 102a, 102b (collectively referenced as 102), such as social networks (e.g., SKYPE®, YAHOO®, MYSPACE®, TWITTER®, FRIENDSTER®, SECONDLIFE, LINKEDIN® and/or FACEBOOK®), via a telecommunications network. The system 100 comprises a service provider (SP) subsystem 103 communicatively coupled to an IP network (IPN) subsystem 122 which includes the web-based networks 102.

The web-based networks 102 may include social networking and blogging services utilizing SMS (Short Message Service), MMS (Multimedia Messaging Service), electronic mail (email), IM (instant message), voice message, and/or voice and/or video communication. A user may create respective accounts on the web-based networks 102. Each of these accounts may have an associated contact list (e.g., a "buddy" list or "friends" list) created by the user of the account. The contact list includes a list of registered users on the web-based network 102a and 102b known as "contacts", "friends" or "buddies". In this case, contacts (e.g., Buddy 1, Buddy 2, . . . ,Buddy n) in the web-based network 102a contact list are collectively referenced as 101a, and contacts in the web-based network 102b contact list are collectively referenced as 101b. The contacts in the web-based networks 102 are collectively referenced as 101. It will be understood by those skilled in the art that the contacts 101 are not necessarily buddies or friends of the device user, but may include the device user's business associates, professional service providers, family members, etc. Additionally, contacts 101 can be the device user's MYFAVES® contacts or a set of telephone numbers associated with reduced rate calling plan for the calling party.

The service provider subsystem 103 comprises one or more devices 104a, 104b . . . 104n (collectively referenced as 104), a web portal 106, a gateway or messaging server 108, a network address book (NAB) server 110, and a database 112 (illustrated in FIG. 1B), all of which are configured to be communicatively coupled to a service provider network 114. The device 104 may, for example, be a fixed or mobile device, such as a wired, wireless or cordless phone, Unlicensed Mobile Access or UMA enabled device, portable computer, handheld computer, smartphone, media player, and the like. A user of the device 104 may be a subscriber to a telecommunications service provider servicing the SP subsystem 103. The user may additionally have a registered account with one of the web-based networks 102 or alternatively multiple registered accounts for multiple web-based networks 102. Furthermore, the user may have respective contact lists associated with the registered accounts. The device 104 includes one or more identifiers, such as a phone number or a Mobile Subscriber Integrated Services Digital Network (MSISDN) number, an International Mobile Subscriber Identity (IMSI) number, a MAC address, an IP address, or other identifiers capable of identifying the device 104 on either or both of service provider subsystem 114 and IP network subsystem 122.

The web portal 106 may, for example, be a webpage operated or owned by the telecommunication service provider servicing the service provider subsystem 103. Alternatively, the web portal 106 may be operated by a third party service provider. The web portal 106 is configured to allow the user to register for telecommunication service between-the device 104 and the web-based networks 102. In an embodiment, the user inputs registration information, either via the device 104 that will conduct telecommunications with the web-based networks 102 or via a computer or other internet-accessible device over an alternate network, into the web portal 106 corresponding to respective registration information used for registered accounts on the web-based networks 102. Alternatively or in addition, the device 104 may be configured to automatically provide all or part of such registration information into the web portal 106. The registration information may be respectively associated with one or more registered accounts on the web-based networks 102 and may, for example, include a username and password or other login credentials that were used to register the user accounts with the web-based networks 102. Alternatively and/or additionally, the registration information may be setup information of one or more e-mail account types, instant messaging (IM) accounts, voicemail accounts. Further information related to set-up of one or more email accounts may be found in the assignee's U.S. patent application Ser. No. 12/115,531, entitled, "SYSTEM AND METHOD FOR ACCOUNT SETUP FOR MOBILE DEVICES, SUCH AS AN EMAIL ACCOUNT SETUP," filed May 5, 2008, which lists A. Bhalekar and M. Penwala as inventors. Additionally, the web portal 106 receives one or more device 104 identifiers, such as a phone number, MSISDN number, IMSI, MAC address, IP address or similar identifier associated with the device 104. The identifier may be input into the web portal 106 by the device 104 user or may be automatically provided by the device 104. The web portal 106 forwards or pushes the registration information and the identifier to the messaging server 108. Consequently, the device 104 does not require client-specific (i.e., web-based network 102) software to be loaded thereon in order to retrieve the device 104 user's contacts 101 from respective ones of the web-based networks 102.

The messaging server 108 may, for example, be a Voice Instant Message (VIM) Gateway, or a Vendor Independent Messaging (VIM) server or gateway. The messaging server 108 may include a protocol (e.g., email protocol) to provide a common layer where dissimilar messaging programs can share data and back-end services. The messaging server 108 maps the device 104 identifier(s) with the registration information associated with web-based network(s) 102 and stores such mapping in one or more database(s) 112.

Figure 1B:
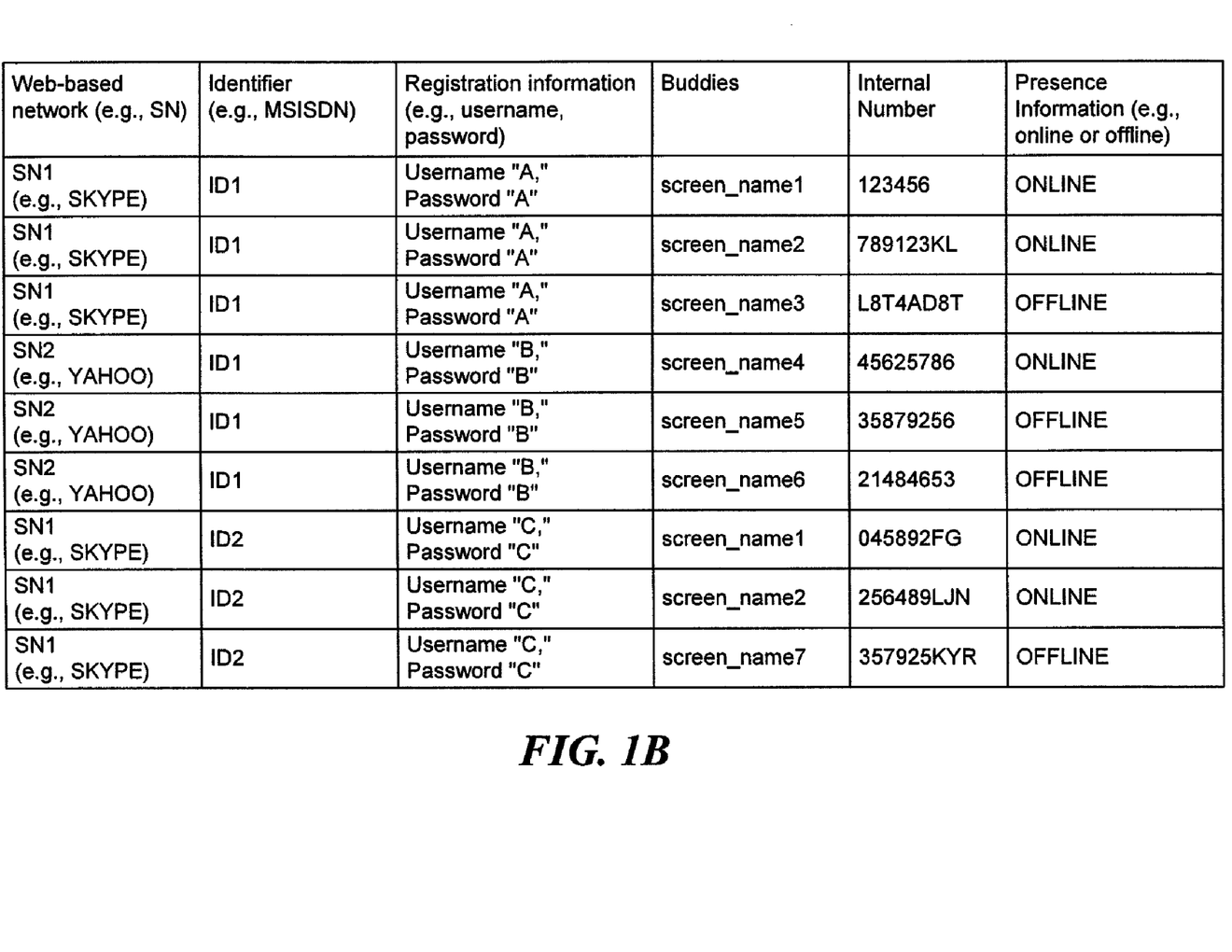
FIG. 1B is an illustration of a database component included in the system of FIG. 1A.

As illustrated in FIG. 1B, the stored mapping may take the form of a table stored in the database 112. While a table is shown, other data structures may, of course, be used. The database 112 may be maintained by the service provider servicing the service provider subsystem 103. The database 112 may be accessible to the messaging server 108 via the service provider (SP) network 114 or, alternatively, the database 112 may be embedded within the messaging server 108. In one embodiment, in response to the device 104 being powered and/or switched ON, the messaging server 108 accesses the database 112 to determine the respective registration information associated with the accounts on the web-based networks 102. In an embodiment, the messaging server 108 may access the database 112 to determine the respective registration information associated with the accounts on the web-based networks 102 when the device 104 user attempts to initiate telecommunication with a contact 101.

The messaging server 108 may use the registration information in the database 112 to log into the web-based networks 102 and retrieve the user's contacts 101 and their associated presence information. The retrieved contacts 101 and associated presence information may be stored in the database 112 and mapped to the user's identifier and account registration information for the web-based networks 102. The messaging server 108 may repeatedly access the user's respective accounts on the web-based networks 102 to obtain real-time presence information and real-time contact lists using, for example, web services methods that are known in the art. Such account access may occur repeatedly in a small period of time to reflect presence status of the contacts 101 in substantially real-time. For example, access may occur periodically every few seconds or even several times per second. The web services methods may, for example, be converted to IMS (IP Multimedia Subsystem) type subscribe/notify methods for the wireless network. IMS is an open, standardized, user-friendly, next generation networking (NGN) multi-media architecture for mobile and fixed devices. The IMS is a VoIP implementation based on a 3GPP variant of session initiation protocol (SIP), and runs over standard internet protocol (IP).

The messaging server 108 creates internal strings or numbers, such as unique Direct Inward Dialing (DID) entries, to be associated with respective ones of the contacts 101. The internal number may, for example, be a numeric string address ("123456"), alphanumeric string address ("L8T4AD8T"), hexadecimal number, or other "dummy" address which, when entered into a device 104, initiates a communication session or link (e.g., voice/video call, IM communication) with a contact 101 (or "target" contact). As illustrated in FIG. 1B, the internal strings or numbers may also be stored in the database 112 with their respective contacts 101 and mapped to the user's identifier. The database 112 may include data associated with multiple devices (i.e., ID1, ID2, . . . IDN) 104. The database 112 may include email addresses, IM handles, and other electronic addresses (not shown) for the contacts 101.

Additionally, the messaging server 108 may import from a contact list 102, receive from the device 104 user, or may automatically create labels or names that correspond to the respective internal numbers of the contacts 101. The labels permit the user to readily identify the respective contacts 101 to which the internal numbers are associated. The labels may take the form of the screen names used to identify the contacts 101 on the respective web-based networks 102 (e.g., screen_name1, screen_name2). Alternatively, the labels may incorporate a portion of the screen names, various symbols, characters, numeric or alphanumeric strings, or any combination thereof. For example, if a device user (i.e., account subscriber) "User_A" has contacts "screen_name1" and "screen_name2," the labels corresponding to the specific internal numbers for contacts "screen_name1" and "screen_name2" may be "User_A to screen_name1" and "User_A to screen_name2," respectively.

The labels (not shown) may be stored in the database 112. Alternatively and/or additionally, the messaging server 108 may add the created internal numbers to the NAB server 110. The NAB server 110 may be operated or owned by the service provider which provides service for the service provider network 114. Alternatively, the NAB server 110 may be operated or owned by a third party service provider. The NAB server 110 and its associated features may be separate from the database 112, integrated into the database 112, or any other combination thereof. Although the NAB server 110 and the database 112 are described and illustrated herein as separate components, such description should not be construed as limiting the scope of the invention. The NAB server 110 may be configured to store the device 104 user's address book, and/or to synchronize the device 104 user's contacts list 102 stored in database 112 with the device 104 address book.

The messaging server 108 may store in the NAB server 110 the internal numbers and corresponding labels of all the contacts 101 and provide an indication of the presence status of the contacts 101. The messaging server 108 may add to the NAB server 110 the presence information associated with the user's contacts 101. Presence identifiers may be used to indicate the presence information of the user's contacts 101. For example, the presence identifiers may be used to form displayable characters that change color and/or shape in relation to the detected online status of the respective contacts 101. Respective presence identifiers may, for example, appear proximate to the contact labels upon being loaded onto the device 104 via the NAB server 110 (as described below), such that the user can readily determine whether respective contacts 101 are online. The presence detection may occur in real-time or substantially close to real time.

The network address book (NAB) server 110 is configured to synchronize data stored therein with the device 104. In other words, the NAB server 110 loads the labels and associated internal numbers onto the device 104, which does not have residing software specific to the web-based networks 102. For example, the NAB server 110 may forward data including the labels and associated internal numbers to the device 106 for storage and/or updating previously forwarded and locally stored data. Alternatively, the NAB server 110 may forward the data including the labels and presence identifiers associated with the internal numbers to the device 106 for storage and/or updating previously forwarded and locally stored data. The data forwarded from the NAB server 110 to the device 104 may, for example, be stored in a phonebook, contact list, or similar internal memory of the device 104 (e.g., mobile phone). The internal memory of the device 104 may take the form of a SIM, phone internal memory, or removable memory card (e.g., SD-card flash memory) or any logical combination thereof. For example, the data may form at least a portion of the device's contact list. The synchronization of the NAB server 110 data with the device 104 may occur each time the messaging server 108 accesses the user's respective accounts on the web-based networks 102 such that the presence status of the contacts 101 may be reflected in substantially real-time. For example, synchronization may occur periodically every few seconds or even several times per second or incrementally when there is a change in data. The synchronization session between the NAB server 110 and the user's device 104 may occur through a Synchronization Markup Language Data Synchronization (SyncML DS) session or other device synchronization signal or method.

In some embodiment, the NAB server 110 may be integrated into the database 112 or the database 112 may be integrated into the NAB server 112. For example, the messaging server 108 may access the database 112 via the NAB server 110.

Upon synchronization of the NAB server 110 with the device 106, the device user may readily identify the contacts 101 that are present on the web-based network 102 and initiate communication with selected contacts 101. The user may select the label, e.g., from the device 104 contact list or address book, that corresponds to the "target" contact. In some embodiments, the user may select the desired label using voice activation. The user may advantageously implement auto-dialing features such that the device 104 will automatically dial the internal number corresponding to the user-selected label, such as upon utterance by the user of the appropriate label or upon implementing automatic speed-dialing. Autodialing and voice activation features are known in the telecommunications industry. Alternatively, the user may select to view the internal number associated with the user-selected label and manually dial the internal number. It will be appreciated by those skilled in the art that several methods exist for dialing the internal number.

In some embodiments, the system 100 permits the user's device 104 and the called-party telecommunications device (e.g., a fixed or mobile device, such as a wired, wireless or cordless phone, Unlicensed Mobile Access or UMA enabled device, portable computer, handheld computer, smartphone, media player, and the like) to communicate while having installed thereon a client application to accept a call via an interface associated with the web-based network 102 (e.g., social network).

The service provider network 114 may include one or more cellular networks or IP-based networks. The cellular network may, for example, take a form of a GSM or UMTS broadcast architecture, or a combination thereof. Those skilled in the art will understand that GSM and/or UMTS are typical of all cellular network architectures. As is known in the telecommunications industry, GSM network architecture includes one or more Base Station Controllers (BSCs) that control one or more base stations or Base Transceiver Stations (BTSs). The UMTS network architecture includes at least a Radio Network Controller (RNC) which provides control functionality of base stations (i.e., Node B's). Both the BTSs and the Node B's are communicatively coupled to the user's device 104.

In some embodiments, a picocell may be communicatively coupled to a base station in the cellular network. The picocell is a wireless access point typically covering a relatively small area, such as within a building (e.g., office, shopping mall, train station, or the like) or within an aircraft, ship, train or other vehicle. A picocell may, for example, be analogous to a WiFi access point, except that it typically broadcasts using the licensed spectrum of an associated wireless carrier. The picocell serves as an access point for routing communication between the device 104 and the network. One or more picocells may be coupled to the BSC by way of wired or wireless connection. It will be appreciated by those skilled in the relevant art that picocell implementations of the invention are within the scope of aspects of the invention disclosed herein.

Alternatively, the IP-based network, may take the form of a VoIP broadcast architecture, UMA or GAN (Generic Access Network) broadcast architecture, or a femtocell broadcast architecture. Voice Over Internet Protocol, or VoIP, is a telecommunication system for the transmission of voice over the Internet or other packet-switched networks. Unlicensed Mobile Access or UMA, is the commercial name of the 3GPP Generic Access Network or GAN standard. Somewhat like VoIP, UMA/GAN is a telecommunication system which extends services, voice, data, and IP Multimedia Subsystem/Session Initiation Protocol (IMS/SIP) applications over IP-based networks. For example, a common application of UMA/GAN is in a dual-mode handset service in which device users can seamlessly roam and handover between local area networks and wide area networks using a GSM/Wi-Fi dual-mode device. UMA/GAN enables the convergence of mobile, fixed and Internet telephony, sometimes called Fixed Mobile Convergence. Femtocells are much like picocells, broadcasting within the licensed spectrum of a wireless telecommunications carrier. Femtocells are typically designed for use in residential or small business environments. Femtocells connects to the service provider's network much like UMA/GAN access points, namely over IP-based networks.

The IP network (IPN) subsystem 122 may further include a computer 116 (e.g., Personal Computer, laptop, smartphone), a web server 118, and an IP network 120. The user may gain access to respective accounts on the web-based networks 102 by entering the registration information on the computer 116 through the web server 118. The registration information is sent to the web-based network 102 via the IP network 120. The IP network may includes one or more networks that use the standardized internet protocol suite (e.g., TCP/IP).

Figure 1C:
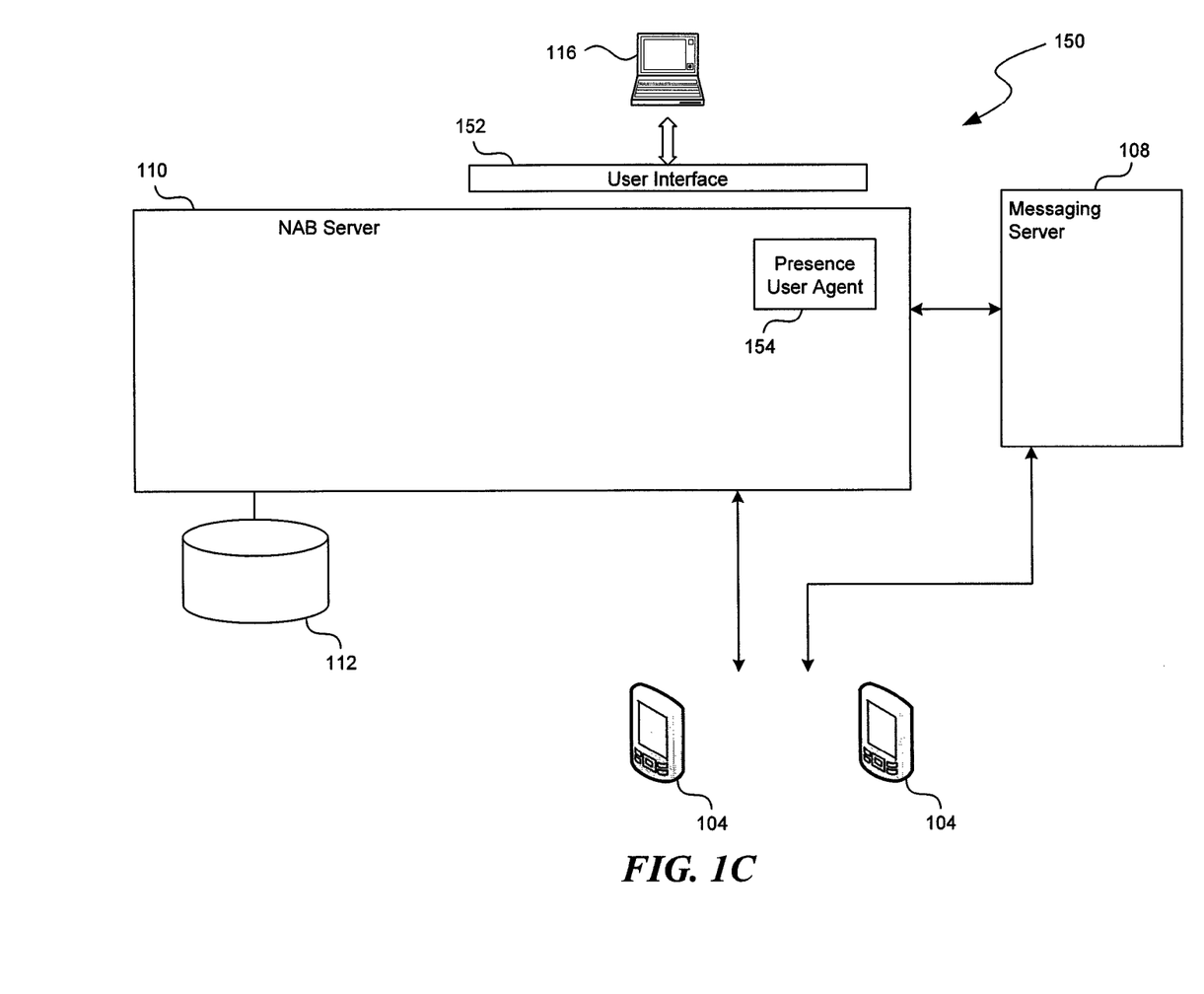
FIG. 1C is a schematic illustration of a presence determination system for determining the presence information of devices on a network.

FIG. 1C shows a schematic illustration of a presence determination system 150 for determining the presence information of devices on a network, according to one embodiment of the invention.

The system 150 includes the devices 104, the messaging server 108, the NAB server 110 and the database 112. The system 150 is operable to inform a respective one of the devices 104 that at least one of the other devices 104 is available or present (e.g., registered with the system 150). For example, the messaging server 108 may inform a first one of the devices 104 that a second one of the devices 104 is present and forward to the second one of the devices 104 presence information values. The second one of the devices 104 may, for example, use a sync session (e.g., syncML) to forward its presence information changes to the NAB server 110. According to some embodiments, the NAB server 110 publishes or transmits the presence information of the second one of the devices 104 to the messaging server 108 such that the messaging server 108 may notify the first one of the devices 104 of the presence information changes. The messaging server 110 may be allocated with a duty to notify the devices 104 of any presence information changes by way of a known protocol or standard.

As discussed above, the NAB server 110 may by operable to publish account attribute information (e.g., presence information) of respective ones of the devices 104. In some embodiments, a user of a respective one of the devices 104 may publish account attribute information via a transmitting device (e.g., mobile phone, PC client) or via the internet or other network. Account attribute information may be synched regardless of the device type used to publish and later display the attribute information. For example, account attribute information may be transmitted or published by a mobile phone and later viewed via the internet by way of a computer or similar computing device.

The NAB server 110 may be a system capable of accessing, modifying, and storing an Address Book which may reside remotely in a user device 104 (e.g., mobile phone). A Network Address Book may be a list of data (e.g., telephone numbers, names, labels, or other identifiers) associated with the identification of other entities or devices 104. The device 104 user is operable to communicate with the network address book, which may be stored in the database 112. The Network Address Book may be stored independently of any particular device such that the information in the Network Address Book can be accessed at any time through various means, such as the NAB server 110. For example, the Network Address Book could be a user's address book associated with his or her cellular phone, which typically includes a list of names and contact information, such as cellular phone numbers, for those with whom the user communicates. Although an electronic address book is one example of the Network Address Book, other lists, such as a list of incoming and outgoing telephone numbers on a cellular phone can also constitute a Network Address Book.

The NAB server 110 may be communicatively coupled to the messaging server 108 and the database 112, thereby taking the form of a computer system capable of accessing, modifying and storing what is commonly referred to as the user's electronic address book. Although the embodiment in FIG. 1C shows the NAB server 110 coupled to the messaging server 108 and the database 112, such specific interconnectivity is not required.

The synchronization session between the NAB server 110 and the user's device 104, which may occur through the Synchronization Markup Language Digital Signal (SyncML DS) session or other device synchronization signal or method, allows for the device 104 to access the most recent information included in the user's Network Address Book. Use of the SyncML DS session may be more efficient than, for example, XML Configuration Access Protocol (XCAP), and may also obviate the need for XCAP capabilities in devices 104 (e.g., phones) implementing presence identification. The synchronization advantageously minimizes the risk of confusing the device 104 user with inconsistent and possibly conflicting address book data when, for example, the user obtains a replacement device with an empty local address book.

In one embodiment, the user's device may then register to an Internet Protocol Multimedia Subsystem (IMS) and start the presence client through the messaging server 108 to begin sending and receiving presence Information. IMS uses IP Multimedia Services Identity Module (ISIM), which may run on a smart card and include parameters for identifying and authenticating a user to IMS. Similarly, the device 104 can be programmed to notify the messaging server 108 of certain conditions that may impair the sending or receiving of communication, such as when the user turns off or suspends the device 104, the device's battery is running low, and device 104 signal strength is minimal. The notification allows the messaging server 108 to update other device 104 users of the user's change in presence status, such as "offline" or "unavailable." It is also possible for the device to register or de-register with IMS or other subsystems performing a similar function, irrespective of whether the synchronization with the NAB server 110 occurs.

In the embodiment shown in FIG. 1C, communication between the user's device 104 and the messaging server 108 may occur through a Session Initiation Protocol (SIP) following SIP SIMPLE 1.0. It will be appreciated that other protocols, capable of similar functionality, may also be used. When a user's device 104 first registers with the messaging server 108, after being turned on, the messaging server 108 automatically begins accessing the information included in the user device's Network Address Book and also begins publishing this particular device 104 user as being "online" or "available," absent any specific instructions from the user to the contrary. According to one embodiment, the messaging server 108 accesses the network address book stored in the database 112 via the NAB server 110.

The messaging server 108 uses the information obtained from the user's Network Address Book to determine presence information about the devices or device users listed in the user's Network Address Book. For example, the messaging server 108 may check for presence information related to other devices listed in the Network Address Book based on the telephone numbers associated with each of those devices 104. The messaging server 108 sends notifications to the user's device 104 of the current status of each of the devices listed in the user's Network Address Book. For example, the device 104 user could be notified through the messaging server 108 whether each of the devices listed in the Network Address Book is "available", "unavailable", or the device status is "unknown" because no presence information is available for that specific device. As the messaging server 108 is updated with new presence information, the messaging server 108 sends updates to the user's device 104 so that the user has automatically updated presence information. In other embodiments, the system 150 is configured to disable automatic updates to the user and the presence information is updated at the specific request of the user, or updates at specified times and/or intervals.

In some embodiments, the NAB server 110 may be configured to screen the user's Network Address Book, such that devices having ascertainable presence information are transmitted to the messaging server 108. Such may advantageously minimize unnecessary communication with the messaging server 108.

In another embodiment the device 104 user may access, change, and view presence information through a user interface which may be communicatively coupled to the NAB server 110, such as through the internet. When the device 104 user initially connects to the user account through the user interface, the connection may be registered to the Internet Protocol Multimedia Subsystem (IMS), and a Presence User Agent 154 may be initiated. The Presence User Agent 154 informs the messaging server 108 of the user's status as "online" or "available" absent any instructions from the user to the contrary, such as if the user wanted their status to be displayed as "offline" or "unavailable" because they did not want others to know that they were "available."

Further details on determining presence information may be found in the assignee's copending U.S. application Ser. No. 12/345,659, entitled, "SYSTEM AND METHOD FOR THE DISTRIBUTION AND USE OF PRESENCE INFORMATION," filed Dec. 29, 2008, which lists Adrian Buzescu as inventor(s).

Registration and Synchronization Method

Figure 2:
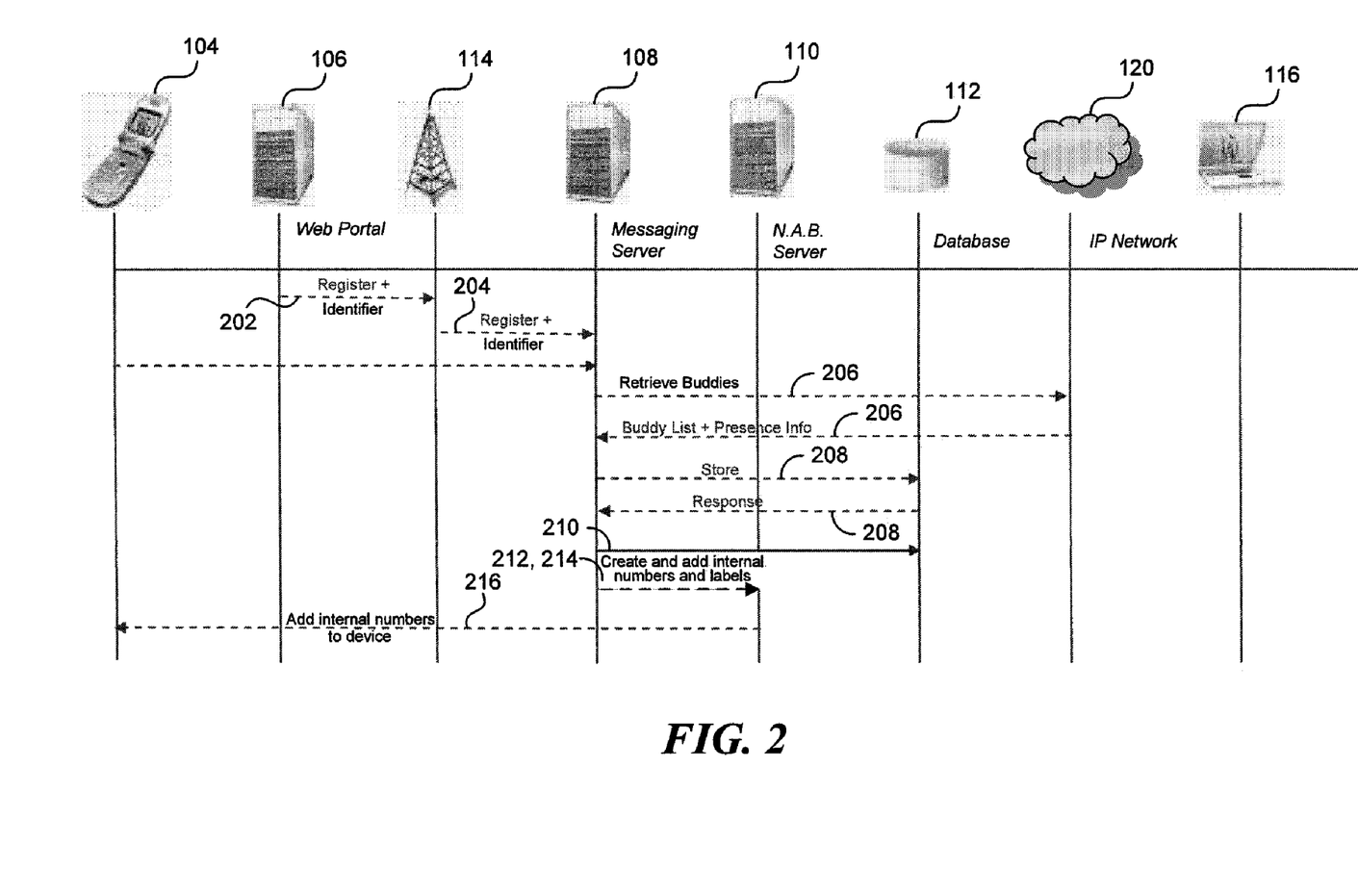
FIG. 2 is a flow diagram of a method for registering and synchronizing a device, such as a telecommunications device.
Figure 3:
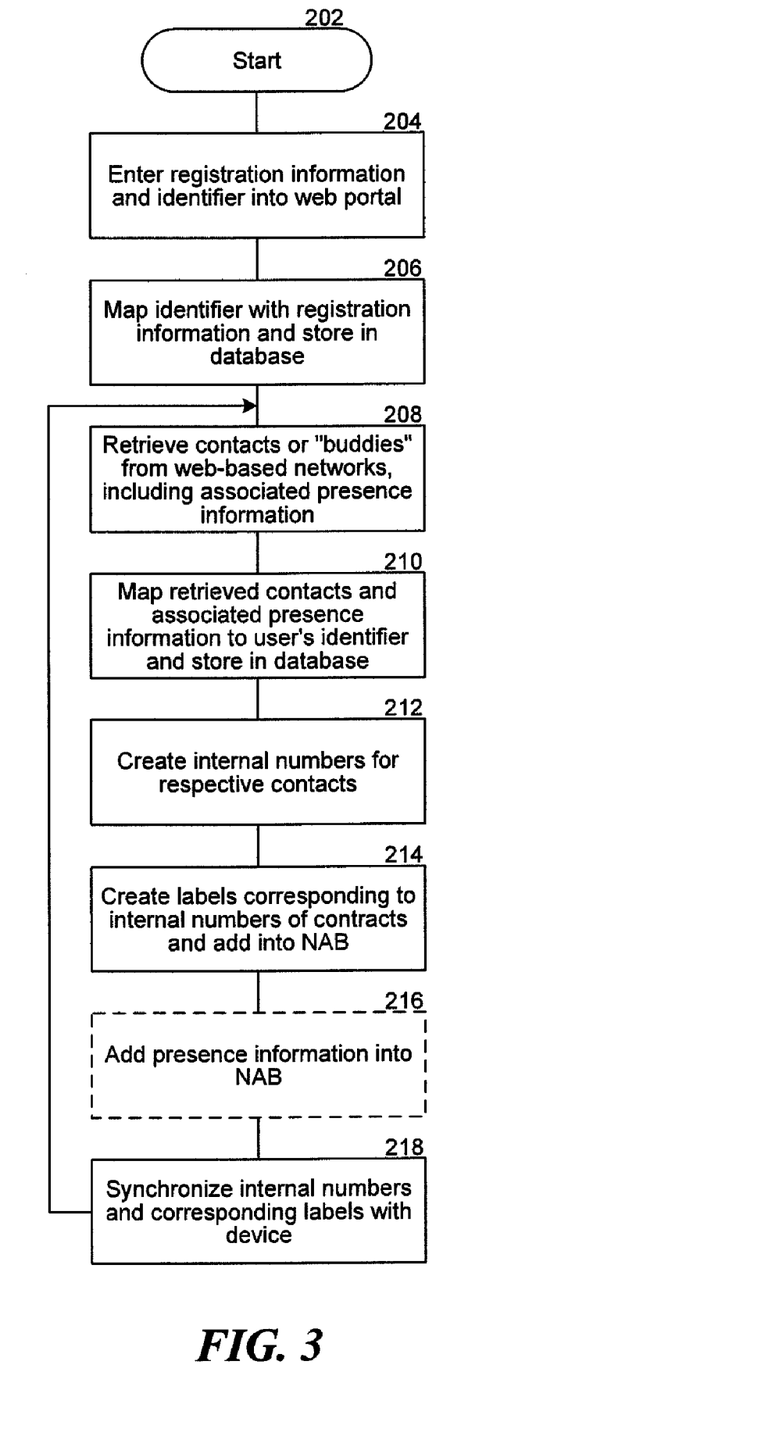
FIG. 3 is a flowchart illustrating the registration and synchronization method of FIG. 2.

FIG. 2 shows a flow diagram of a method 200 for registering and synchronizing the device 104, while FIG. 3 shows a flowchart illustrating the registration and synchronization method 200 of FIG. 2.

The following discussions of registration, synchronization, and communication initialization methods and features, can be implemented separately or in combination. Although the registration and synchronization methods and features are described in a single flow diagram and flowchart, it will be appreciated by those skilled in the art that both methods may operate independently of the other. For example, the registration process may provide a universal social network registration process, while the synchronization and communication initialization processes provide a universal social network account synchronization and communication session establishment method.

The method 200 starts, for example, at 202, in response to the user creating one or more accounts on respective web-based networks 102. At least some of the user's accounts include a contact list, which comprises a list of user-generated screen names representing other registered users or "contacts" on the particular web-based network 102. The contact list may be a user-specific network of contacts 101 which can be viewed by the user when logged onto the web-based network 102 supporting the contact list.

At 204, the user enters, via the web portal 106, the login credentials or registration information (e.g., user name and password) associated with the respective accounts on the web-based networks 102, and the identifier (e.g., MSISDN). The web-portal 106 forwards the registration information and the user's identifier to the messaging server 108 via the service provider network 114. In some embodiments, the service provider subsystem 103 may automatically add the identifier based on the user's prior login to the web portal 106. Alternatively, the user may input a MIN or other device 104 identification.

At 206, the messaging server 108 maps the identifier with the registration information associated with the respective accounts on the web-based networks 102, and stores the mapping in the database 112. The mapping may, for example, be stored in the database 112 in the form of the table. The table associates the identifier with the respective registration information and web-based networks 102. As mentioned above, the database 112 may be separate from the NAB server 110, embedded in the NAB server 110, or any other combination thereof. Thus, in some embodiments, the mapping may, for example, be stored in the NAB server 110.

At 208, in response to activation of the user's device 104, the messaging server 108 accesses the user's respective accounts on the web-based networks 102 and retrieves contacts 101 from the respective contact lists. The messaging server 108 accesses the database 112 and uses the registration information associated with the web-based networks 102 to gain access to these respective accounts on the web-based networks 102. Once the messaging server 108 accesses the user's accounts on the web-based networks 102, the messaging server 108 automatically retrieves the contacts 101 included in all the respective contact lists and their associated presence information (i.e., online status). The messaging server 108 may repeatedly access the user's respective accounts on the web-based networks 102 to determine real-time presence information and contact lists. Such account accessing may occur repeatedly in a small period of time to reflect presence status of the contacts 101 in substantially real-time. For example, access may occur every few seconds or even several times per second. In other embodiments, the web-based network 102 pushes the contacts 101 and/or associated presence information to the messaging server 108. Such may occur repeatedly to reflect real-time presence status of the contacts 101. For example, the web-based network 102 may push the contact and/or associated presence information to the messaging server 108 when there is a change of state in the subscription/notify method.

In some embodiments, the messaging server 108 may be configured to retrieve the contacts 101 that are present (i.e., online or have a status of "active" or "busy") and not to retrieve contacts 101 that are not present (i.e., offline or have an online status of "away"). It will be understood by those skilled in the art that the messaging server 108 may be configured to selectively retrieve the contacts 101 using other criteria such as user-selected criteria. For example, the user may select those contacts 101 that are to be retrieved by the messaging server 108 that will ultimately be loaded onto the user's device 104.

At 210, the retrieved contacts 101 and associated presence information are stored in the database 112 and mapped to the user's identifier.

At 212, the messaging server 108 creates the internal numbers (e.g., "dummy" numbers) which are to be associated with the contacts 101. The internal numbers may, for example, be numeric or alphanumeric addresses, such as DID entries, which can be manually or automatically entered into the device 104 to establish a communication link (e.g., voice/video call, SMS, MMS, email, or IM) with respective ones of the contacts 101 ("target" contacts). The internal numbers are stored in the database 112 with their respective contacts 101 and are mapped to the user's identifier.

At 214, the messaging server 108 creates the labels that correspond to the respective internal numbers of the contacts 101 and adds these labels and corresponding internal numbers into the NAB server 110. The labels are such that the user may readily identify the respective contacts 101 to which the corresponding internal numbers are associated. The messaging server 108 may automatically create the labels, or the user may create and/or adjust the labels independent of the messaging server 108.

Optionally, at 216, the messaging server 108 may add into the NAB server 110 the presence information associated with the user's contacts 101. Presence identifiers may be used to indicate the presence information of the user's contacts 101. For example, the messaging server 103 may add respective presence identifiers proximate the labels such that the presence status of the contacts 101 may be identifiable.

At 218, the NAB server 110 synchronizes the data, which includes the internal numbers and corresponding labels, with the device 106. The NAB server 110 forwards the data to the device 106 for storage and/or updating of previously forwarded data. Alternatively, the NAB server 110 may forward data, which includes the labels and presence identifiers associated with the internal numbers, to the device 106 for storage and/or updating of previously forwarded data. The data may, for example, form at least a portion of the phonebook of the device 104, which can be stored on the internal memory or SIM of the device 104.

The method 200 passes control to 208 and waits for the messaging server 108 to re-access the user's respective accounts on the web-based networks 102.

Communication Initialization Method

Figure 4:
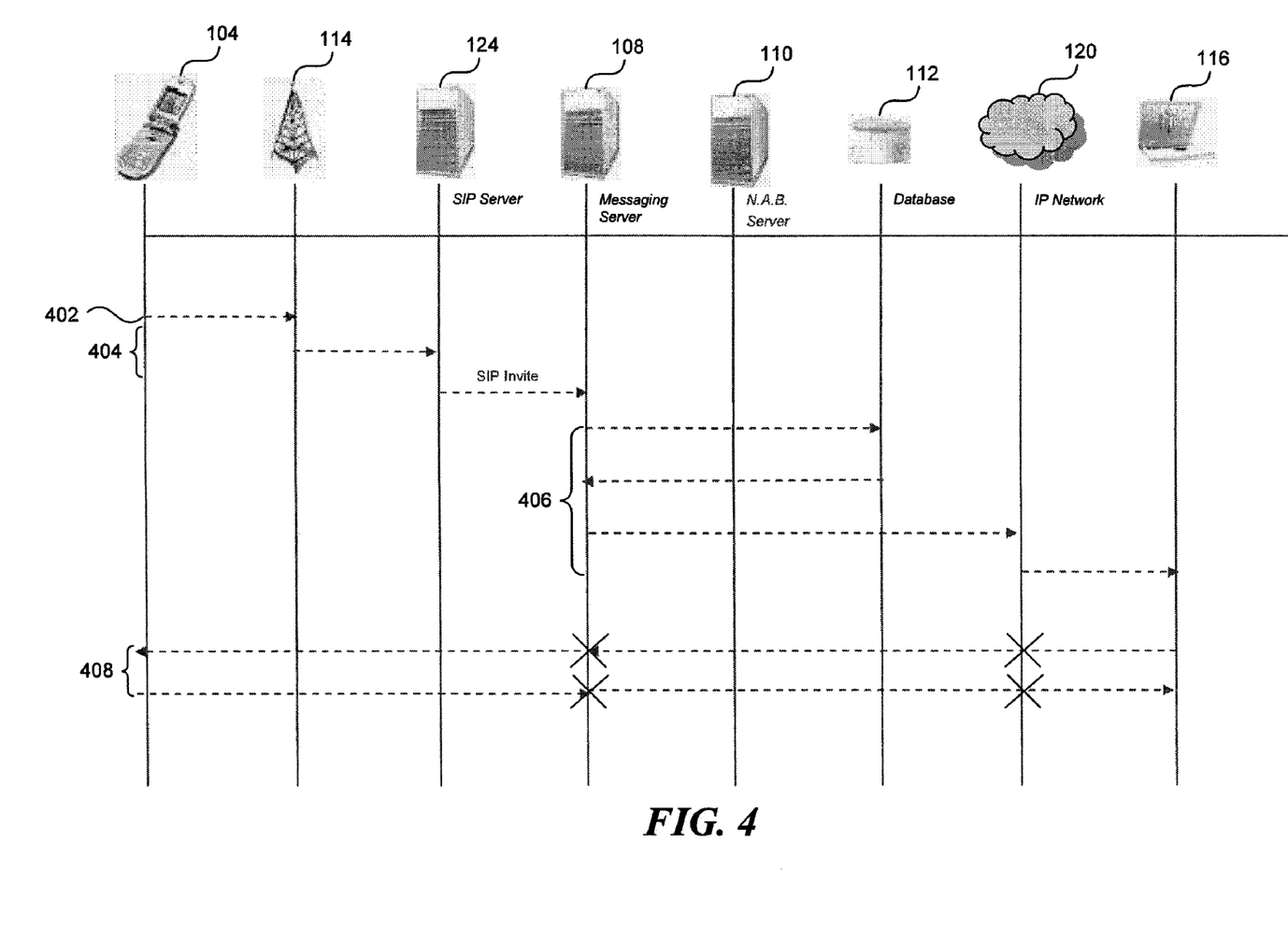
FIG. 4 is a flow diagram of a method for establishing a communication link with contacts on a web-based network.
Figure 5:
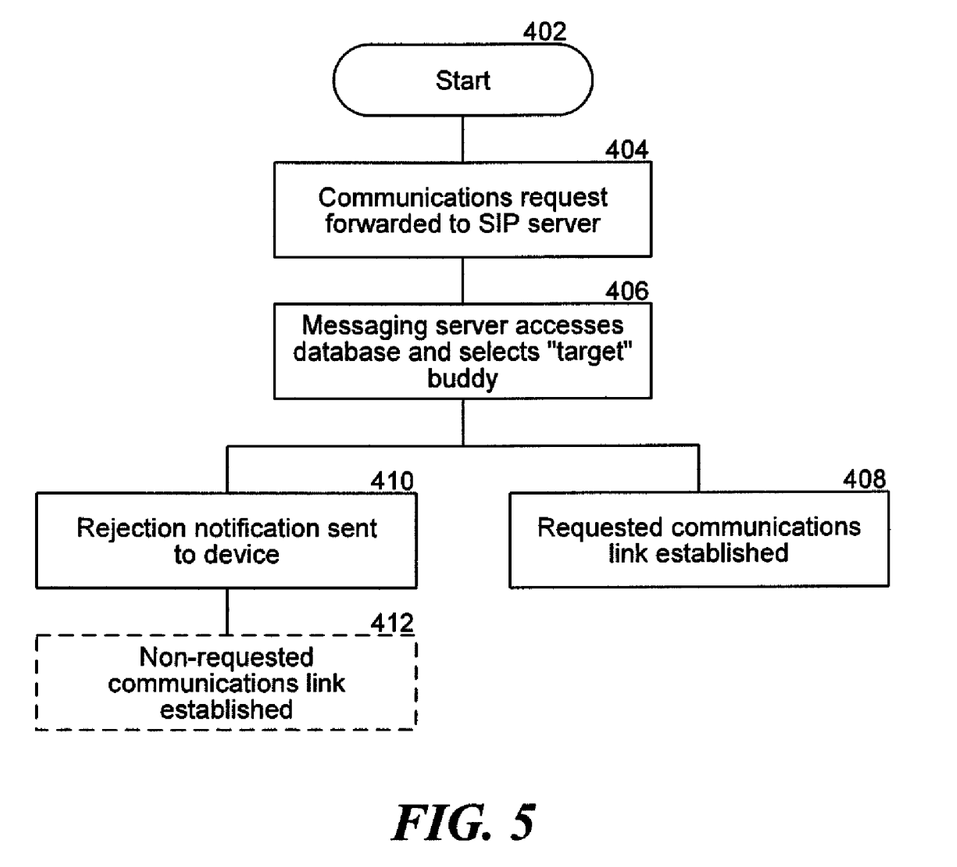
FIG. 5 is a flowchart illustrating the method of FIG. 4.

FIG. 4 shows a call-flow diagram of a method 400 for establishing a communication link with respective contacts 101, while FIG. 5 is a flowchart illustrating the method 400 of FIG. 4.

The method 400 starts at 402, for example, in response to the user initiating a communication request such as, for example, a video/voice call, IM session, or MMS session with a respective one of the contacts 101 (i.e., a "target" contact). The communication request may, for example, be in the form of a call from a device. As discussed above, the user may select the label, e.g., from the device 104 contact list or address book, that corresponds to the "target" contact 101. Then the user may advantageously implement auto-dialing features such that the device 106 will automatically dial the internal number corresponding to the user-selected label. The selection of the label corresponding to the "target" contact 101 and the autodialing of the internal number may occur in a single voice activation step, as is known in the telecommunications industry. In other embodiments, the user may manually select and/or enter the internal number to initiate the communication request with the "target" contact 101. Alternatively, the user may initiate multiple communication requests with multiple "target" contacts 101. Such communication requests may, for example, include requests for conferencing with multiple contacts 101 simultaneously, or establishing separate communication links with respective contacts 101. One skilled in the art will recognize that multiple communication requests to multiple "target" contacts 101 falls within the scope of aspects of the invention described herein.

At 404, the communication request is forwarded through the SP network 114 to a SIP (Session Initiation Protocol) server 124. The SIP server 120 is configured to setup SIP calls in the IP network 120. For example, the SIP server 120 may have various functions such as helping route requests to the user's location, authenticate and authorize users for services, implement provider call-routing policies, and provide features to users. As is known in the telecommunications industry, SIP is a standard for setting up telephone calls, multimedia conferencing, instant messaging, and other types of real-time communications. The SIP server 124 converts the communication request to a SIP invite and sends to the messaging server 108.

At 406, upon receiving the SIP invite, the messaging server 108 accesses the database 112 and selects the "target" contact 101. The "target" contact 101 is selected based on the mapping of the user's identifier to the internal number. In other words, the messaging server 108 performs a search of contacts 101 in the database 112 to determine the respective one (i.e., "target" contact) that has the user's identifier and the internal number associated therewith. Once the "target" contact 101 is selected, the messaging server 108 then forwards the SIP invite (e.g., invite for voice/video call, multimedia conference, instant messaging session, and/or other types of real-time communications) to the "target" contact through the IP network 120. In other embodiments, communication (e.g., communication session invite) from the messaging server 108 to the "target" contact 101 may by implemented via an application programming interface (API) method defined by and unique to the web-based network 102, such as when the web-based network 102 does not employ SIP.

Mapping the user's identifier to the internal number advantageously blocks a third party device user from establishing a communications link (or communications session) with the "target" contact 101 associated with the device 1 04, user. For example, if the third party device user enters the internal number associated with contact "Screen_name1," the messaging server 108 will determine that the third party device identifier does not match up with the internal number. In response, the messaging server 108 will reject the communications attempt initiated by the third party device. Thus, although the third party communications request may be forwarded to the messaging server 108, it will ultimately be rejected and a communications request will not be forwarded to the contact 101 on the web-based network 102.

At 408, if the "target" contact 101 accepts the SIP invite, the communication link is established between the device 104 user and the "target" contact 101 present on the web-based network 102. Otherwise, at 410, if the "target" contact 101 rejects the SIP invite, an alert (e.g., a rejection notification) may be sent to the device 104 user who initiated the communications request. Alternatively and/or additionally, at 412, the "target" contact 101 may merely reject the type or format of the communications link or communications session that was requested, and instead respond to the device 104 user via another communications format. For example, if the device 104 user requested a voice call, the "target" contact 101 may reject the voice call request and instead respond with an IM session initiation.

The method 400 passes control to 402 and waits for the user of the device 104 to initiate another communication request with one or more of the contacts 101.

The methods 200 and/or 400 may include additional acts, may omit some of the above-described acts and/or may perform acts in a different order than set out in the flow diagram.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while aspects of the invention are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention.

Other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A system for establishing synchronous communications between at least one mobile telecommunications device and a called party associated with a called-party telecommunications device, wherein the mobile telecommunications device is associated with a cellular telecommunications network, an IP-based telecommunications network, or a converged telecommunications network, the system comprising:
 a network server computer, coupled to the wireless telecommunications network, and coupled to an IP based network,
  wherein the called party is associated with a social networking site,
  wherein the social networking site is available over the IP based network, and
  wherein the network server computer is configured to coordinate communications between the mobile telecommunications device and the called-party telecommunications device, without the need for the mobile telecommunications device to have installed thereon a client application enabling synchronous communication with the social network; and
 a database configured to communicate with the network server computer, wherein the database stores a table of contacts associated with the mobile telecommunications device, wherein the network server computer automatically populates at least a portion of the table based on data for the called party, wherein the network server computer automatically obtains the data from the social networking site, and wherein the table includes:
  an identifier associated with the mobile telecommunications device or the user,
  an alphanumeric label associated with the called party, and
  at least one internal network address associated with the called-party telecommunications device, wherein each internal network address permits the mobile telecommunications device to place a synchronous communication with the called-party telecommunications device, but wherein the internal network addresses are inapplicable for use outside of at least the wireless telecommunications network.

2. The system of claim 1 wherein the identifier is a Mobile Subscriber Integrated Services Digital Network (MSISDN) number, wherein the alphanumeric label is a user name, and wherein the internal network address is a dummy phone number or Direct Inward Dialing (DID) number.

3. The system of claim 1 wherein the table is a network-based address book, and wherein the network server computer periodically updates an address book internally stored on the mobile telecommunications device based on the network-based address book.

4. The system of claim 1 wherein the table includes presence information to indicate availability of the called party, and wherein the network server computer periodically updates called party availability information for the mobile telecommunications device.

5. A method of permitting telecommunications sessions between a telecommunications network customer and a social networking contact, wherein the telecommunications network customer is associated with a user device, and wherein the social network contact is associated with a telecommunications device, the method comprising:
 automatically obtaining, from a social networking site and via a public computer network, contact information for the social networking contact;
 automatically creating at least a portion of a database that stores the contact information, wherein the contact information is associated in the database with at least one identifier, and wherein the identifier is associated with the telecommunications network customer or the user device;
 receiving input from the user to initiate a telecommunications session with the social networking contact or with the telecommunications device; and
 initiating a telecommunications session between the telecommunications device and the user device,
  wherein the initiated telecommunications session is performed without the user device having installed thereon a specific client application to accept the telecommunications session via an interface associated with the social network, and
  wherein the telecommunications session is initiated based on the contact information stored in the at least a portion of the database.

6. The method of claim 5 wherein the telecommunications network is a wireless network, wherein the public computer network is the internet, wherein the user device is a cell phone, wherein at least one of the telecommunications devices is a personal computer or laptop computer, and wherein the cell phone communicates with the personal computer or laptop through both the wireless network and the internet.

7. The method of claim 5 wherein automatically creating at least a portion of a database includes associating an internal telephone number with the social networking contact or telecommunications device, wherein the internal telephone number is incapable of being used to make calls outside of at least the wireless network.

8. The method of claim 5 wherein the database includes presence information to indicate availability of the social networking contact, and wherein the method includes providing to the user device the presence information.

9. The method of claim 5 wherein the identifier is a unique wireless number for the user, and wherein the database includes logon credentials for the user, wherein the logon credentials permit the user to log onto the social networking site.

10. The method of claim 5 wherein initiating a telecommunications session includes initiating a voice call, and wherein at least a portion of the voice call employs a voice over Internet Protocol (VoIP) protocol.

11. The method of claim 5 wherein initiating a telecommunications session includes initiating a text messaging or instant messaging session.

12. The method of claim 5 wherein the telecommunications network is a wireless network, and wherein the database includes a select set of telephone numbers associated with reduced rate calling plan for the calling party.

13. The method of claim 5 wherein the contact information includes a phone number for the social networking contact.

14. A tangible computer-readable medium storing computer instruction for a method of permitting a telecommunications session between a customer of a wireless telecommunications network and a social networking contact, wherein the telecommunications network customer is associated with a wireless user device, and wherein the social network contact is associated with a telecommunications device, the method comprising:

automatically obtaining, from the social networking site and via a public computer network, contact information for the social networking contact;

automatically creating at least a portion of a database that stores the contact information, wherein the contact information is associated in the database with at least one identifier, and wherein the identifier is associated with the telecommunications network customer or the wireless user device, wherein automatically creating at least a portion of a database includes associating an internal telephone number with the social networking contact or telecommunications device, wherein the internal telephone number is incapable of being used by mobile devices to make calls outside of the wireless telecommunications network;

receiving input from the wireless user device to initiate a telecommunications session with the social networking contact or with the telecommunications device; and initiating a telecommunications session between the telecommunications device and the wireless user device, wherein the telecommunications session is initiated based on the contact information stored in the at least a portion of the database.

15. The computer-readable medium of claim 14 wherein the public computer network is the Internet, wherein the wireless user device is a cell phone, wherein the telecommunications device is a personal computer or laptop computer, and wherein the cell phone communicates with the personal computer or laptop through both the wireless network and the internet.

16. The computer-readable medium of claim 14 wherein the initiated telecommunications session is performed without the wireless user device or the telecommunications device having installed thereon a specific client application to accept the telecommunications session via an interface associated with the social network.

17. The computer-readable medium of claim 14 wherein the database include presence information to indicate availability of the social networking contact, and wherein the method includes providing to the wireless user device the presence information.

18. The computer-readable medium of claim 14 wherein the identifier is a unique wireless number for the user, and wherein the database includes logon credentials for the user, wherein the logon credentials permit the user to log onto the social networking site.

19. The computer-readable medium of claim 14 wherein initiating a telecommunications session includes initiating a voice call, and wherein at least a portion of the voice call employs a voice over Internet Protocol (VoIP) protocol.

20. The computer-readable medium of claim 14 wherein initiating a telecommunications session includes initiating a text messaging or instant messaging session.

21. The computer-readable medium of claim 14 wherein the wireless telecommunications network is a wireless network, and wherein the database includes a select set of telephone numbers associated with a reduced rate calling plan for the calling party.

22. The computer-readable medium of claim 14 wherein the contact information includes a phone number for the social networking contact.

23. A system to establish a communication session between a telecommunications device and one or more users on web-based networks, the system comprising:

a web portal configured to receive registration information associated with one or more registered accounts on the web-based networks and an identifier of the telecommunications device,
wherein the one or more registered accounts include respective contact lists defined by a user of the telecommunications device,
wherein the contact lists include registered users on the web-based networks;

a messaging server operable to access the one or more registered accounts on the web-based networks based at least in part on the registration information and to determine the registered users on the web-based networks which are included in the contact lists,
wherein the messaging server creates internal addresses to be associated with the registered users and maps the internal addresses to the identifier of the telecommunications device,
wherein the messaging server creates labels corresponding to the respective internal addresses, and
wherein a client-specific software is not loaded onto the telecommunications device;

a database configured to store at least the registered users included in the contact lists of the web-based networks and the corresponding mapping of the internal addresses to the identifier of the telecommunications device; and a synchronization component having stored therein the internal addresses and corresponding labels of the registered users included in the contact lists,
wherein the synchronization component is operable to forward the internal addresses and corresponding labels of the registered users to the telecommunications device,
wherein the internal addresses and corresponding labels are selectively retrievable by the user of the telecommunications device, and
wherein the telecommunications device can initiate a telecommunications session with a selected user of the registered users based on contact information stored in the database.

24. The system of claim 23, further comprising a communications server configured to receive a communications request for a respective one of the registered users and the internal address associated with the respective one of the registered users, wherein the communications server converts the communications request into a formatted communications request recognizable by the web-based networks.

25. The system of claim 24 wherein the respective one of the registered users is a "target" buddy.

26. The system of claim 24 wherein the communications server is a SIP (Session Initiation Protocol) server operable to convert the communications request into a SIP format.

27. The system of claim 24 wherein the messaging server accesses the database in response to receiving the formatted communications request, the messaging server retrieves the respective one of the registered users if the internal number associated therewith is mapped to the identifier of the telecommunications device, and the messaging server does not retrieve the respective one of the registered users if the internal number associated therewith is not mapped to the identifier.

28. The system of claim 23 wherein the web-based networks are social networks.

29. The system of claim 23 wherein the synchronization component is a Network Address Book (NAB) server.

* * * * *